(12) United States Patent
Vander Meiden et al.

(10) Patent No.: US 6,396,905 B2
(45) Date of Patent: *May 28, 2002

(54) METHOD AND APPARATUS FOR ROUTING BLOCKED TELEPHONE CALLS

(75) Inventors: David A. Vander Meiden, Boca Raton; Leroy E. Gilbert, Wellington, both of FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,088

(22) Filed: Dec. 15, 1997

(51) Int. Cl.[7] .................................... H04M 1/24
(52) U.S. Cl. ........................ 379/34; 379/221; 379/198
(58) Field of Search .................... 379/198, 1, 2, 379/9, 10, 12, 15, 16, 18, 22, 23, 26, 221, 32, 34, 231, 24, 232, 225

(56) References Cited

U.S. PATENT DOCUMENTS 5,212,691 A * 5/1993 Hokari ..................... 379/221
5,802,141 A * 9/1998 Kobayashi ................. 379/22
5,838,769 A * 11/1998 McNiel et al. .............. 379/14
5,930,348 A * 7/1999 Regnier et al. ............ 379/221

FOREIGN PATENT DOCUMENTS

| EP | 0 413 490 | * 2/1991 | ........... H04Q/11/04 |
| GB | 2 300 089 | * 10/1996 | .......... H04M/15/16 |

OTHER PUBLICATIONS

Copy of European Search Report for EP Appln. No. 98123312.5: date Search Report issued: Nov. 8, 2000.*

* cited by examiner

*Primary Examiner*—Duc Nguyen
*Assistant Examiner*—Rexford N. Barnie

(57) ABSTRACT

A telecommunication system includes a private branch exchange (170) that uses an automatic route selection algorithm to select a trunk on which a call is to be routed. A number of trunk groups are queried for an available trunk and once an available trunk is located, the call is placed. The automatic route selection algorithm monitors the call to determine if an error message or error tone is received. If an error message or error tone is received, a set of remaining trunk groups not previously queried are queried for an available trunk to route the call.

5 Claims, 4 Drawing Sheets

METHOD AND APPARATUS FOR ROUTING BLOCKED TELEPHONE CALLS

FIELD OF THE INVENTION

The present invention relates to telecommunication systems in general, and in particular to routing systems such as private branch exchanges.

BACKGROUND OF THE INVENTION

As the number of telephone service providers increases, most teleconmmunication equipment, such as private branch exchanges (PBX) have the ability to select from several telephone carriers to use when placing a call. The choice of which carrier to use is based on such factors as the capacity of the carrier, the price of a call, desired call quality, etc.

When placing a call on a public switched telephone network a typical PBX uses an automatic route selection (ARS) algorithm to search among trunk groups operated by different public network carriers for an available trunk. Once an available trunk is located, the call is placed by the PBX. If a problem occurs with the call so that the call cannot be completed by the carrier, the carrier plays a message to the caller asking them to hang up and try the call again. When the call is re-attempted, the ARS algorithm will begin searching the available trunk groups and select another trunk on which the call can be placed. Unless network conditions have changed, it is likely that the user will encounter the same error message received on the previous call. Using this approach, the caller may incur the same error message several times in a row regardless of whether the call could have been placed with another carrier having excess capacity.

Given the shortcomings in prior art communication systems, there is a need for a system that can detect and respond to the informational messages produced by the telephone carrier in order to increase the probability of successful completion with which a call can be placed.

SUMMARY OF THE INVENTION

The present invention is a telecommunication system that can detect and interpret the informational messages indicating that there is a problem with completing the call through the selected public network carrier. A private branch exchange (PBX) is programmed to implement an automatic route selection algorithm that selects a trunk to carry a telephone call. The automatic route selection (ARS) algorithm monitors the telephone call for an informational message to be transmitted from the carrier indicating that there is a problem with the telephone call placed. If a problem occurs, the automatic route selection releases the first trunk and selects another trunk from a set of remaining trunk groups to ensure that a call is not rerouted over the trunk initially selected. On an ISDN line, the error message is detected on the D channel. On an analog line, the private branch exchange is programmed to detect the special information tones (SIT) or error tones that precedes a spoken error message.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is a communication system that can detect and interpret informational messages indicating that there is a problemcompleting the call through the selected public network carrier.

Figure 1:
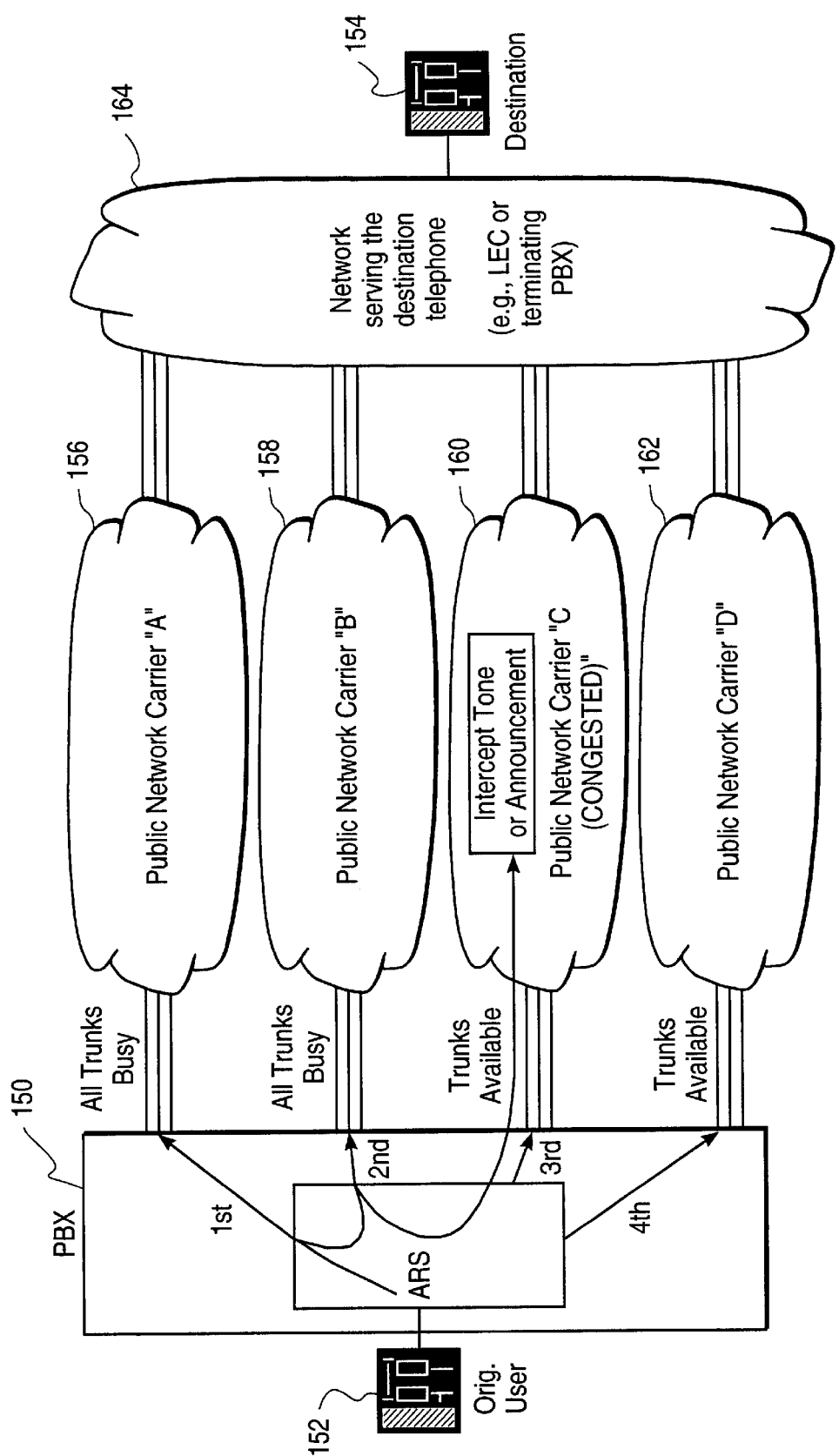
FIG. 1 illustrates a prior art automatic route selection algorithm.

As shown in FIG. 1, a conventional private branch exchange 150 couples a telephone call placed from an originating telephone 152 to a destination telephone 154. A central processing unit within the private branch exchange 150 implements an automatic route selection (ARS) algorithm that can route the telephone call over a number of public network carriers 156, 158, 160 or 162 by selecting an available trunk from a trunk group that provides access to the desired carrier. The ARS algorithm selects a particular trunk group based on a number of factors, most typically the cost and network capacity of each trunk group. The ARS algorithm queries each trunk group until a group having an available trunk is located. In the example shown, the trunk groups that provide access to carriers 156 and 158 are busy. The trunk group that provides accesses to carrier 160 has an available trunk and therefore the PBX 150 selects this trunk group to place the call.

In a conventional private branch exchange, the ARS algorithm terminates as soon as an available trunk is located. If a problem occurs within the public network carrier with a call placed on the selected trunk group, the caller will be connected to a network tone or announcement which provides the user with an audible indication of the nature of the failure. The caller's only recourse is to hang up and attempt the call again. For the newly placed call, the ARS algorithm will begin searching all available trunk groups to find another available trunk. Often, the algorithm will select the same trunk group previously selected to carry a call. If the network conditions have not changed, it is likely that the call will not be successfully connected on the second attempt. This process can continue indefinitely until the network condition changes.

Figure 2:
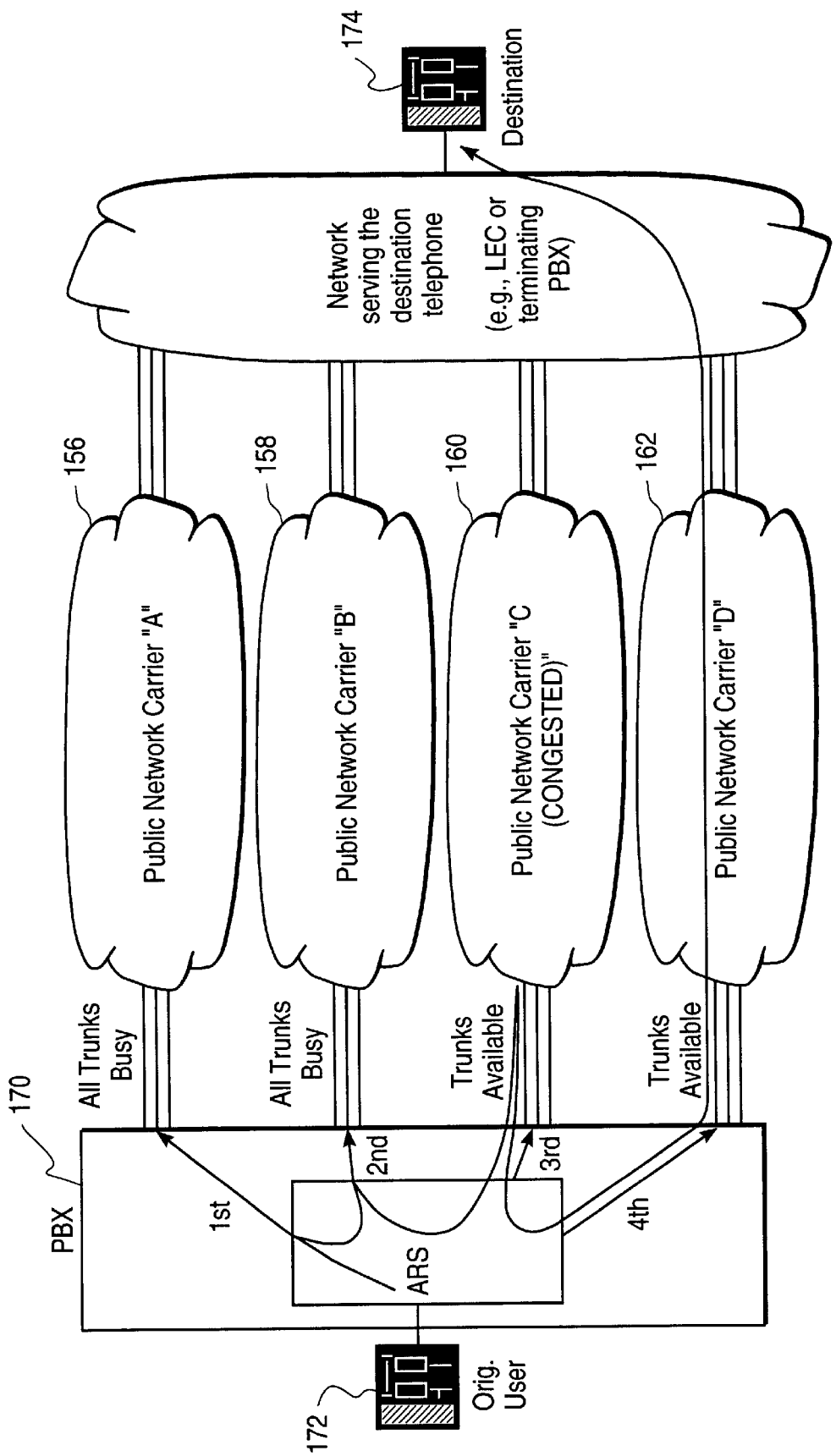
FIG. 2 illustrates an automatic route selection algorithm according to the present invention.

A private branch exchange 170 that is constructed according to the present invention is shown in FIG. 2. Here, the private branch exchange operates to connect a call from a source telephone 172 to a destination telephone 174 over one of the plurality of public network carriers 156, 158, 160 and 162 by selecting an available trunk from a trunk group that provides access to the desired carrier. Again, the private branch exchange implements an automatic route selection algorithm that interrogates each of the trunk groups sequentially to determine which trunk group has an available trunk. In the example shown, the trunk group that provides access to carrier 160 has an available trunk and the call is placed on this trunk group. However, instead of terminating the ARS algorithm, the algorithm continues to monitor the call for an error message to be transmitted from the selected public network carrier. If an error message is received and the call cannot be completed on that trunk, the algorithm releases that trunk and continues its search for an available trunk among those trunk groups not previously interrogated. For example, as shown in FIG. 2, if a problem occurs with a call placed on the trunk group that provides access to carrier 160, then the ARS algorithms interrogates the next trunk group that provides access to carrier 162 for an available trunk. If a trunk is available, it is selected to carry the call. By monitoring the public network carrier for error messages or error tones and continuing the search when a problem is detected, the call will have a higher probability of successful completion.

Figure 3:
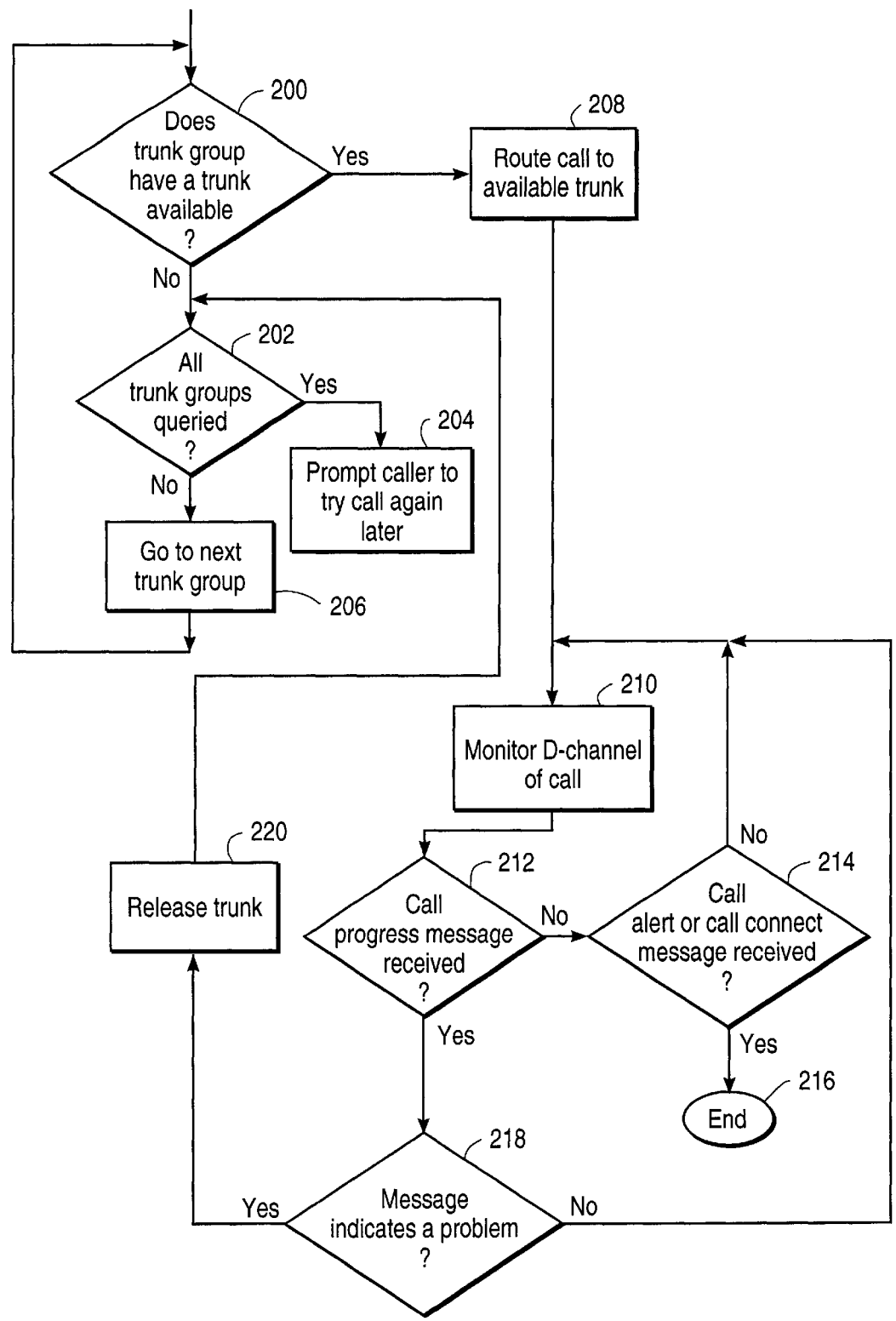
FIG. 3 is a flowchart illustrating the steps performed by the automatic route selection algorithm according to the present invention using digital trunks that use common channel message-oriented signaling to access a telecommunications network.

FIG. 3 illustrates a series of steps performed by the present invention to select a trunk group and monitor a call placed on a digital trunk that uses common channel message-oriented signaling such as an ISDN trunk. Beginning with a step 200, the automatic route selection algorithm begins looking at each trunk group to determine whether the trunk group has a trunk available. If the trunk group does not have a trunk available, then processing proceeds to a step 202, wherein it is determined if all trunk groups available have been queried. If so, processing proceeds to a step 204 and the caller is prompted to try their call at a later time. If trunk groups exist that have not been queried, the ARS algorithm proceeds to the next trunk group at a step 206 and processing then returns to step 200 until a trunk group is located having an available trunk or all trunk groups have been queried.

If a trunk group is located that has a trunk available, processing proceeds to a step 208, wherein the call is routed over the available trunk. Once the call is placed with the available trunk group, the ARS algorithm does not cease operation but continues to monitor the call for an error message to be received.

When the call is placed on a digital trunk that uses common channel message-oriented signaling, such as an ISDN trunk, the ARS algorithm begins monitoring the D-channel of the trunk at a step 210. At a step 212, the algorithm determines whether a call progress message has been received. If not, processing proceeds to a step 214, wherein it is determined if a call alert or call connect message has been received. If a call alert or call connect message has been received, the ARS algorithm terminates at a step 216. If no call alert or call connect message has been received at step 214, processing returns to step 210 until a call progress, call alert, or call connect message has been received.

Once a call progress message has been received, processing proceeds from step 212 to a step 218, wherein the call progress message is analyzed to determine whether the message indicates that a problem has been encountered with completing the call through the selected public network carrier. If the call progress message does not indicate that a problem has occured, then the ARS algorithm assumes that the call is proceeding normally and processing returns to step 210 to look for another call progress message to be received.

If the answer to step 218 is yes, then the ARS algorithm knows that the call cannot be placed over the selected public network carrier and the trunk to that carrier is then released at a step 220. Processing then returns to step 202 and the remaining trunk groups that were not initially queried for an available trunk are then queried to determine if they have an available trunk. If a trunk group is found having an available trunk, then the call is rerouted on the available trunk.

Figure 4:
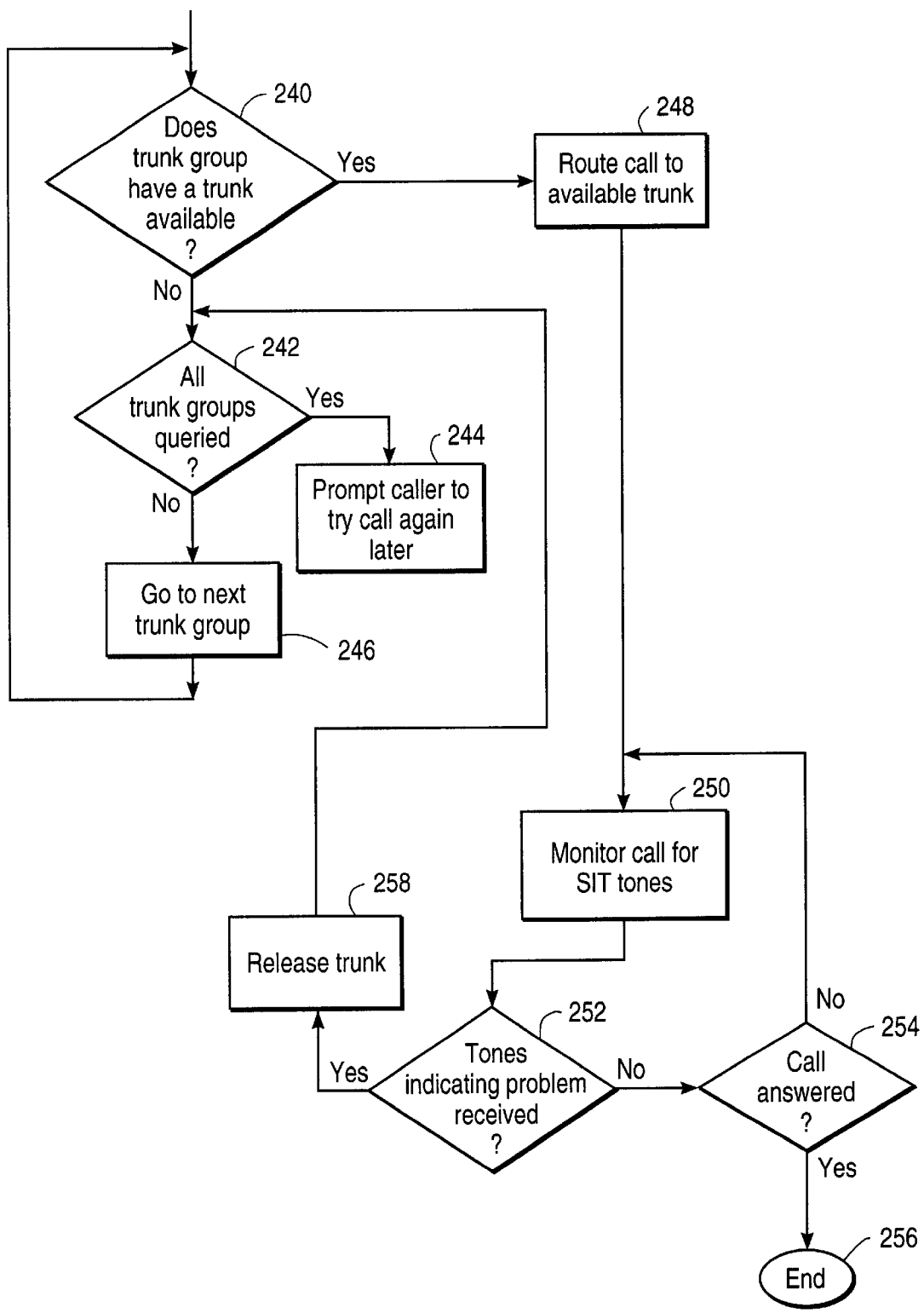
FIG. 4 is a flowchart of the steps performed by the automatic route selection algorithm according to the present invention using analog trunks to access a telecommunication network.

Some telephone networks may not employ digital trunks that use common channel message-oriented signaling. Therefore, FIG. 4 illustrates the series of steps performed by the present invention to locate an available trunk group using analog trunks.

Beginning at a step 240, the ARS algorithm determines whether a trunk group has a trunk available. If not, processing proceeds to step 242, wherein it is determined if all trunk groups have been queried. If all trunk groups have been queried, processing proceeds to step 244 and the user is prompted to try their call again later. If not all the trunk groups have been queried, the ARS algorithm selects the next trunk group at step 246, after which processing returns to step 240 to determine whether the next trunk group has an available trunk.

Once a trunk group is located having an available trunk, the call is routed on the available trunk at a step 248. The ARS algorithm then begins a loop at a step 250 that monitors the call for the presence of a special information tone (SIT) that indicates a problem has been encountered with completing a call through the selected public network carrier. As will be appreciated by those skilled in the art, the SIT tones are the error tones that precede a spoken message indicating that there is a problem with a call. Each type of problem is specified by tones having a predetermined pitch or frequency. Therefore, by determining the pitch or frequency of the tones, the ARS algorithm can deduce the nature of the problem. At a step 252, the ARS algorithm determines whether tones indicating a problem have been received. If not, processing proceeds to a step 254, wherein it is determined if the call has been answered. The presence of an answered call is generally detected by the cessation of the ringing signal. If the call has been answered, the ARS algorithm halts operation at step 256. If the answer to step 254 is no, processing returns to step 250, to again monitor the call for an SIT tone to be received.

If the answer to step 252 is yes, and SIT tones indicating a problem were received, the ARS algorithm releases the trunk at a step 258 and returns to step 242 to interrogate the remaining trunk groups for an available trunk.

As will be appreciated from the above description, this embodiment of the invention allows a private branch exchange to monitor the progress of a call and to reroute the call over an alternate trunk if a problem occurs within the selected public network carrier. Using the present invention, a user is less likely to be informed that a call cannot be completed when a private branch exchange has other trunk groups over which a call can be placed.

What is claimed is:

1. A telecommunication system, comprising:
   a private branch exchange that connects a call initiated from a source telephone to a destination telephone over one of a number of trunk groups providing access to a number of different public network carrier systems;
   a central processing unit within the private branch exchange that searches the number of trunk groups and selects one of the number of trunk groups to carry the call, said central processing unit monitoring the call for call progress messages transmitted by the network carrier system accessed by the selected trunk group and searches the trunk groups not previously searched to locate another trunk group that accesses another network carrier system in response to a call progress message received indicating that the call could not be completed by the network carrier system accessed by the first selected trunk group;
   wherein the central processing unit continues to monitor the call until a call progress message is received indicating that the call could not be completed by the network carrier system accessed by the selected trunk group or until the call is answered.

2. The telecommunication system of claim 1, wherein the central processing unit selects a trunk group by querying the number of trunk groups to determine if a trunk group has an available trunk on which the call can be placed and if a call progress message is received indicating that the call could not be completed by the network carrier system accessed by the selected trunk group, queries one or more trunk groups not previously queried to determine if a trunk is available.

3. The telecommunication system of claim 1, wherein the trunk is an ISDN trunk and wherein the central processing unit monitors the call by looking for call progress messages indicating that the call could not be completed by the network carrier system accessed by the selected trunk group on a D-channel of the ISDN trunk.

4. The telecommunication system of claim 1, wherein the trunk is an analog trunk, and wherein the central processing unit monitors the call by monitoring the analog trunk for a number of tones indicating that the call could not be completed by the network carrier system accessed by the selected trunk group.

5. The telecommunication system of claim 1, wherein the central processing unit initiates an audio indication to the source telephone that the call cannot be completed upon a call progress message being received indicating that there is a problem with the call and no further trunk is available.

* * * * *